United States Patent [19]

Rehmann et al.

[11] Patent Number: 4,721,893
[45] Date of Patent: Jan. 26, 1988

[54] PROCESS AND APPARATUS FOR CONTROLLING THE ELECTRIC MOTOR DRIVE OF A UNIT FOR THE MANUFACTURE OF MOLDINGS FROM MULTI-COMPONENT PLASTICS

[75] Inventors: Günter Rehmann, Schoenrain; Gerhard Koeniges, Osnabrueck; Werner Mackert, Munich, all of Fed. Rep. of Germany

[73] Assignee: Elastogran Maschinenbau GmbH, Fed. Rep. of Germany

[21] Appl. No.: 745,088

[22] Filed: Jun. 17, 1985

[30] Foreign Application Priority Data

Jun. 16, 1984 [DE] Fed. Rep. of Germany ....... 3422429

[51] Int. Cl.⁴ ............................................. G05B 13/00
[52] U.S. Cl. .................................. 318/332; 318/326; 318/618; 318/571; 425/145
[58] Field of Search ..................... 318/39, 77, 571, 326, 318/332, 615, 616, 617, 618; 364/476; 425/145, 141, 262, 135, 148, 150, 429, 427, 365, 367

[56] References Cited

U.S. PATENT DOCUMENTS

| | | | |
|---|---|---|---|
| 3,778,693 | 12/1973 | Korteling | 318/326 X |
| 3,797,808 | 3/1974 | Ma et al. | 425/145 X |
| 3,889,169 | 6/1975 | Hirschman et al. | 318/326 X |
| 3,930,774 | 1/1976 | Brand et al. | 425/141 |
| 3,955,130 | 5/1976 | Graf | 318/332 |
| 4,008,829 | 2/1977 | Chandra et al. | 318/39 X |
| 4,075,301 | 2/1978 | Oswald | 425/145 X |
| 4,139,811 | 2/1979 | Klinger | 318/615 |
| 4,153,402 | 5/1979 | Sanderson | 425/145 |
| 4,171,193 | 10/1979 | Rahlfs | 425/145 X |
| 4,331,910 | 5/1982 | Kohzai et al. | 318/618 |
| 4,336,013 | 6/1982 | Hand | 425/145 |
| 4,379,987 | 4/1983 | Kohzai et al. | 318/571 X |
| 4,406,605 | 9/1983 | Hand | 425/145 |
| 4,437,046 | 3/1984 | Faillace | 364/476 X |
| 4,470,937 | 9/1984 | Sugimoto et al. | 425/145 X |
| 4,476,417 | 10/1984 | Zimmermann | 318/326 X |

Primary Examiner—William M. Shoop, Jr.
Assistant Examiner—Ip: Shik Luen Paul
Attorney, Agent, or Firm—Keil & Weinkauf

[57] ABSTRACT

To control the intermittent movement of a conveyor belt or carousel, fitted with molds, in a unit for the manufacture of moldings from multi-component plastics, an intended/actual value comparison of the speed of the conveyor belt or carousel as a function of the distance of the molds from fixed devices for filling, demolding and similar operations of the molds is carried out so as to provide control signals for the electric motor. The actual value is determined from a signal voltage generated in correspondence with the rotary movement of the electric motor. The signal voltage is additionally, and in parallel to the speed regulation, converted to electric pulses which are summed in their time sequence, as a function of the movement steps of the conveyor belt or carousel, and are compared with a predetermined master function which can be varied.

2 Claims, 1 Drawing Figure

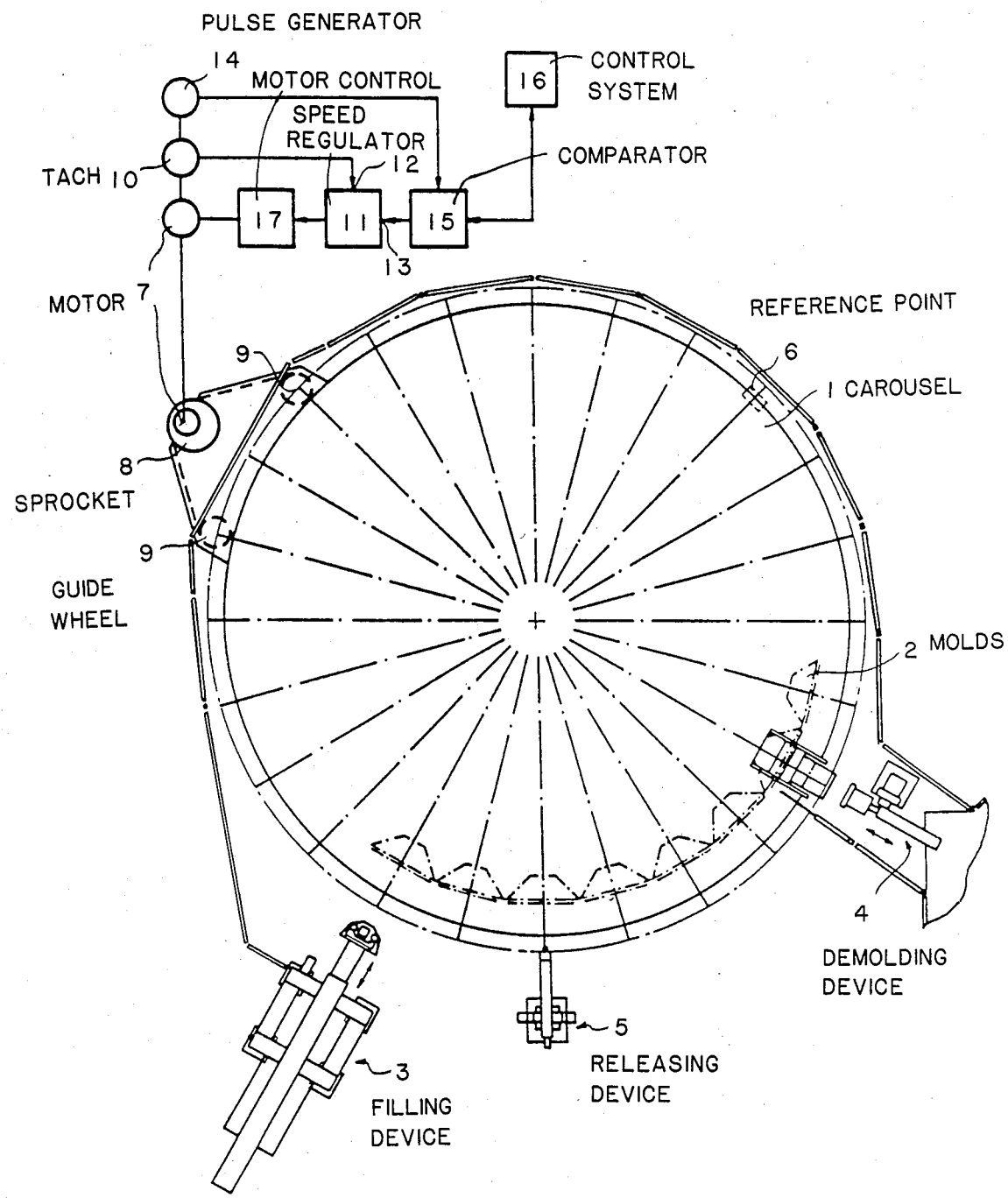

PROCESS AND APPARATUS FOR CONTROLLING THE ELECTRIC MOTOR DRIVE OF A UNIT FOR THE MANUFACTURE OF MOLDINGS FROM MULTI-COMPONENT PLASTICS

In the manufacture of moldings from multi-component plastics it is known to move molds stepwise on oval belts or rotary tables. In such arrangments, the reaction mixture is intermittently introduced into the cavity of the molds. Since the plastic introduced into the molds requires a not unsubstantial curing time, it is necessary—if the oval belts or rotary tables are to operate continuously overall—to provide a large number of molds on the belt or table, which in turn is only possible on units of appropriately large size.

Usually, controllable drives, in particular controllable electric motors, are used for the intermittent motion of the conveyor belts or carousels in the case of rotary tables, the drives being controlled by limit switches on the periphery of the conveyor belt or carousel. Per mold, one only adjustable switch cam is provided, which successively actuates two limit switches, of which the first, in the direction of movement, reduces the speed and the second stops the movement of the conveyor belt or carousel when the mold is in the desired position. The signals provided by the limit switches are compared, in a speed controller, with predetermined intended values, so as to control the electric motor drive. Further circuit elements are provided for the fixed devices for filling, demolding and cleaning of the molds, and trigger the requisite functions for the process sequence.

The setting of the crawl speed, i.e. of the reduced speed of the conveyor belt or carousel, and the positioning of the molds require considerable experience. In particular, difficulties result from the high inertia of the moving parts. These difficulties especially manifest themselves when molds are changed, for example when the machine is refitted with molds of different dimensions or different geometrical shapes, since then movement steps have to be laid down afresh, by readjusting the switch cams and/or limit switches. This makes considerable demands on the operatives, who require long experience and familiarity with these involved procedures. Moreover, such work is extremely time-consuming. The accuracy of the positioning of the molds is also insufficient in many cases, so that means of correction or fine adjustment must be provided on the devices which are fixed relative to the conveyor belt or carousel.

It is therefore the object of the present invention so to control the movement steps of a conveyor belt or carousel fitted with molds that they can be carried out with very high accuracy, without readjustments, and that different distances of advance, or angles of rotation, can be selected.

We have found that this object is achieved by the measures set out in the characterizing clause of claim 1.

According to the invention, not only an intended actual value comparison value of the speed but also an intended/actual value comparison of the movement steps, i.e. of the particular distances of advance of the conveyor belt or the particular rotary movements of the carousel, is made. The comparison parameter in both cases is a signal voltage generated via the electric motor drive. This is compared, on the one hand, with an electrical voltage, to the pattern of which a speed profile is allotted, and, on the other hand, is converted into electric pulses which are summed in their time sequence as a function of the movement steps of the conveyor belt or carousel and compared with a predetermined, variable master function. The periphery of the conveyor belt or carousel is divided into increments corresponding to the number of pulses per revolution. Each movement step is defined by a particular pulse number, so that the function required for the sequence of production of the molding can be freely allotted to any desired position of the molds; in this allotment of the movement steps, the devices having a fixed position relative to the conveyor belt or carousel—for filling, demolding and cleaning of the molds—are also involved. By this incremental subdivision of the periphery of the conveyor belt or carousel, particularly accurate, load-independent positioning of the molds is possible. The accuracy of positioning remains unimpaired even if the conveyor belt or carousel is fitted with molds of different sizes. Such a situation merely requires adaptation of the particular movement steps, through correspondingly changing the number of pulses per movement step.

The apparatus for carrying out the process consists of a tachogenerator connected to a controllable electric motor, the signal voltage of the tachogenerator being passed to the actual-value input of a speed controller with a signal corresponding to the position of the molds being applied to the intended value input of the speed controller, the tachogenerator being coupled to a pulse generator, the pulses of which can be adjusted by means of a comparator circuit, with a preprogrammed pulse number, generated by a control system of the unit, for providing the signal applied to the intended value input of the speed controller.

The apparatus according to the invention operates with great accuracy and is made up of simple, commercially available components. No longer are limit switches and switch cams required for controlling the intermittent movement of the conveyor belt or carousel. Control errors are impossible since the pulse generator is actuated directly by the tachogenerator driven by the electric motor.

The invention is explained in more detail below with reference to the drawing, showing the example of a rotary table.

In the drawing, 1 is the rotatable carousel on which are fixed a plurality of molds 2. Fixed devices for filling, 3, demolding, 4, and cleaning (not shown) of the molds are provided at a distance from the carousel. A device for applying release agent is marked 5. The carousel 11 is caused to rotate by an electric motor drive. This consists of an electric motor 7 which drives a sprocket 8. A drive chain passes over the sprocket 8 and two guide wheels 9 and engages, between the guide wheels, with a toothed crown attached to the carousel.

The carousel 1 is moved intermittently, so that each mold 2 can be stopped in a precisely defined position relative to the devices 3, 4 and 5. In other words, the movement of the carousel takes place, within one revolution, in the number of steps corresponding to the number of molds. The electric motor 7 is provided with appropriate controls for this purpose. These consist of a tachogenerator connected to the electric motor and driveable by the latter. The tachogenerator 10 produces a signal voltage which can be varied in accordance with the rotary movement of the electric motor, and which is, on the one hand, fed to the actal-value input 12 of a speed regulator 11 and, on the other hand, controls, as a function of its time variation, a pulse generator 14. A particular, freely selectable pulse number is allotted to each movement step of the carousel. The pulses, triggered at 14, are summed in their sequence and compared, by means of a comparator circuit 15, with a pulse number preprogrammed in a control system 16 for the unit. The comparator circuit 15 used can be, for example, a circuit which is capable of summing incoming pulses of a pulse generator and comparing this sum with a value predetermined by the control system 16 of the unit, with a signal being released if they are the same. The signal resulting from this comparison is passed to the intended-value input 13 of the speed regulator 11, which is connected to a motor control system 17 for the electric motor 7. Accordingly, the carousel is controlled in predetermined steps via the speed controller and the motor control system, as a function of the intended/actual value comparison of the pulses. Because of the high inertia of the system, the carousel movements can also be carried out at two speed levels, namely running speed and crawl speed immediately before coming to the end of a movement step. Each switchover to crawl speed is determined by a freely selectable pulse number and also results from the comparison with the master function predetermined in the control system 16 of the unit.

The comparator circuit 15 can also consist of a processor, a digital position regulator, a pulse counter and a digital-analogue converter. In that case, the process distance of travel per unit time is calculated from the predetermined distance and corresponding speed, as a function of acceleration and retardation values laid down via the control system 16 of the unit, and is put, as the intended value, into a position regulator following the processor. In the position regulator, this intended value is compared with the actual position value available from the pulse counter. A digital value is then provided at the position regulator output, which, after conversion via the digital-analogue converter, is applied to the subsequent speed controller 11 as an analogue intended value at 13.

Using the control system according to the invention, particularly accurate positioning of the molds is achievable. The deviations are ±1 pulse. To avoid these deviations becoming cumulative, the pulse generator 14 is re-zeroed after each revolution of the carousel by means of a reference point 6.

We claim:

1. A process of controlling the electric motor drive for the intermittent movement of a conveyor belt or carousel, each of which is fitted with molds, in a unit for the manufacture of moldings from multi-component plastics, which process comprises: determining an actual value of the speed of the belt or carousel via a signal voltage generated in accordance with the rotary movement of the electric motor, determining an intended value wherein the signal voltage is additionally converted to electric pulses which are summed in their time sequence as a function of the movement steps of the conveyor belt or carousel and are compared with a predetermined, variable master function, comparing the intended and actual value of the speed of the conveyor belt or carousel as a function of the distance of the molds from fixed devices for filling, demolding and related operations on the molds, so as to produce control signals for the electric motor.

2. An apparatus for controlling the electric motor drive for the intermittent movement of a conveyor belt or carousel, fitted with molds, in a unit for the manufacture of moldings from multi-component plastics, which apparatus comprises: a tachogenerator which is connected to a controllable electric motor wherein a signal voltage of the tachogenerator is fed to the actual value input of a speed controller, along with a signal corresponding to the position of the molds being applied to the intended value input of the speed controller, wherein the tachogenerator is coupled to a pulse generator, the pulses of which are adjusted by means of a comparator circuit with a preprogrammed pulse number, generated by a control system for the unit, so as to provide the signal to be applied to the intended value input of the speed controller.

* * * * *